(12) United States Patent
Ishimura et al.

(10) Patent No.: US 10,800,442 B2
(45) Date of Patent: Oct. 13, 2020

(54) STEERING SYSTEM

(71) Applicant: JTEKT CORPORATION, Osaka-shi, Osaka (JP)

(72) Inventors: Shoji Ishimura, Kashihara (JP); Hidenobu Tanaka, Shiki-gun (JP); Yuji Takahashi, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 37 days.

(21) Appl. No.: 16/250,355

(22) Filed: Jan. 17, 2019

(65) Prior Publication Data
US 2019/0225255 A1 Jul. 25, 2019

(30) Foreign Application Priority Data
Jan. 25, 2018 (JP) .................................. 2018-010436

(51) Int. Cl.
*B62D 1/19* (2006.01)
*B62D 1/181* (2006.01)
*B62D 1/185* (2006.01)

(52) U.S. Cl.
CPC .............. *B62D 1/192* (2013.01); *B62D 1/181* (2013.01); *B62D 1/185* (2013.01); *B62D 1/195* (2013.01)

(58) Field of Classification Search
CPC ........ B62D 1/192; B62D 1/195; B62D 1/181; B62D 1/185
See application file for complete search history.

(56) References Cited

U.S. PATENT DOCUMENTS

| 6,655,716 | B2* | 12/2003 | Riefe | B62D 1/195 188/374 |
| 6,942,250 | B2* | 9/2005 | Dubay | B62D 1/195 280/777 |
| 7,188,867 | B2* | 3/2007 | Gatti | B62D 1/195 280/777 |
| 2002/0167157 | A1* | 11/2002 | Matsumoto | B62D 1/195 280/777 |

(Continued)

FOREIGN PATENT DOCUMENTS

| DE | 102011083190 A1 | 3/2013 |
| JP | 2005-059668 A | 3/2005 |

OTHER PUBLICATIONS

Jun. 26, 2019 Extended Search Report issued in European Application No. 19153454.4.

*Primary Examiner* — Drew J Brown
(74) *Attorney, Agent, or Firm* — Oliff PLC

(57) ABSTRACT

A steering system that is telescopically extendable and retractable using a motor driving force includes a motor, a telescopic steering shaft, a tube that supports the steering shaft such that the steering shaft is rotatable and that is movable with telescopic movement of the steering shaft, an energy absorbing member connected to the tube, and a movable member connected to the energy absorbing member and configured to move the tube by being moved by a driving force of the motor. The energy absorbing member has a stiffness that moves the tube by transmitting the driving force of the motor from the movable member to the tube. The energy absorbing member is deformable to absorb impact energy that is applied to the energy absorbing member through the steering shaft and the tube during a secondary collision.

5 Claims, 11 Drawing Sheets

(56) References Cited

U.S. PATENT DOCUMENTS

| | | | |
|---|---|---|---|
| 2006/0181070 A1 | 8/2006 | Imamura et al. | |
| 2007/0194563 A1* | 8/2007 | Menjak | B62D 1/195 |
| | | | 280/777 |
| 2007/0228716 A1* | 10/2007 | Menjak | B62D 1/195 |
| | | | 280/777 |
| 2013/0074639 A1* | 3/2013 | Toyoda | B62D 1/185 |
| | | | 74/493 |
| 2015/0232117 A1 | 8/2015 | Stinebring et al. | |
| 2016/0046318 A1* | 2/2016 | Stinebring | B62D 1/195 |
| | | | 74/493 |
| 2019/0100230 A1* | 4/2019 | Messing | B62D 1/195 |
| 2019/0126968 A1* | 5/2019 | Messing | B62D 1/195 |

\* cited by examiner

STEERING SYSTEM

INCORPORATION BY REFERENCE

The disclosure of Japanese Patent Application No. 2018-010436 filed on Jan. 25, 2018, including the specification, drawings and abstract, is incorporated herein by reference in its entirety.

BACKGROUND OF THE INVENTION

1. Field of the Invention

The invention relates to a steering system.

2. Description of Related Art

A vehicle collision may cause a secondary collision between a driver and a steering wheel. Steering systems are required to have a mechanism for absorbing an impact exerted by a steering wheel on a driver during a secondary collision. Japanese Patent Application Publication No. 2005-59668 (JP 2005-59668 A) discloses an impact absorbing device for absorbing impact energy during a secondary collision. The impact absorbing device is used for a telescopic steering system that allows adjustment of the distance between a driver and a steering wheel. The impact absorbing device is mounted between a vehicle body and a tube. A steering shaft is inserted through the tube providing a telescopically movable portion of a steering column. Specifically, the impact absorbing device is interposed between a supported member that supports and fixes the tube, and a mount portion of a reinforcement of the vehicle body. The impact absorbing device has a U-phased metal strip that serves as an energy absorbing plate. When the steering column is impacted in the event of a secondary collision, the supported member becomes unfixed from the mount portion of the reinforcement. As a result, the tube moves along with the supported member toward the front of a vehicle. The energy absorbing plate is deformed in accordance with the movement of the tube, thereby absorbing impact energy.

These days there are telescopic steering systems that are driven by a driving force of motors. In such a motor-driven telescopic steering system, a tube is mechanically connected to a motor and thus movable. That is, unlike in JP 2005-59668 A, the tube is not fixed to a supported member. In order to use the impact absorbing device disclosed in JP 2005-59668 A for a motor-driven telescopic steering system, it is necessary to transmit an impact on a steering column to a supported member and to move a tube along with the supported member. A structure for achieving these may be complicated. A simple structure is required for cost reduction and downsizing of a steering system.

SUMMARY OF THE INVENTION

A purpose of the invention is to provide a motor-driven steering system having a simple structure for absorbing an impact in the event of a vehicle collision.

An aspect of the invention provides a steering system that is telescopically extendable and retractable using a motor driving force. The steering system includes the following: a motor; a telescopic steering shaft; a supporting member that supports the steering shaft such that the steering shaft is rotatable and that is movable with telescopic movement of the steering shaft; an energy absorbing member connected to the supporting member; and a movable member connected to the energy absorbing member and configured to move the supporting member by being moved by a driving force of the motor. The energy absorbing member has a stiffness that moves the supporting member by transmitting the driving force of the motor from the movable member to the supporting member. The energy absorbing member is deformable to absorb impact energy when an impact force is applied to the energy absorbing member through the steering shaft and the supporting member during a secondary collision.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering system according to embodiments is described below with reference to the drawings. The embodiments illustrate general or specific examples. Numerical values, shapes, materials, structural elements, arrangement and connection of the structural elements, steps, the processing order of the steps, etc. described in the embodiments are merely examples and are not intended to limit the invention. Out of the structural elements described in the embodiments, structural elements that are not recited in an independent claim most broadly defining the inventive concept of the invention are optional, nonessential elements. A term "substantially" may be used in conjunction with another term, such as "substantially parallel" or "substantially perpendicular", to describe the embodiments. The term "substantially" includes exactly a term it modifies and slight variations therefrom. Thus, for example, the term "substantially parallel" means exactly parallel and slight variations of, for example, a few percent to less than twenty percent. The same is true for other expressions using the term "substantially". The drawings are schematic, not necessarily to scale. In addition, substantially identical structural elements are given the same numerals throughout the drawings, and their description may be simplified or omitted to avoid redundancy.

A steering system 100 according to a first embodiment is described. According to the first embodiment, the steering system 100 is adapted to be mounted on a vehicle, such as an automobile. The steering system 100 is an electric telescopic steering system. That is, the steering system 100 is telescopically extendable and retractable using a motor driving force to allow adjustment of the distance between a driver and a steering wheel 2.

Figure 1:
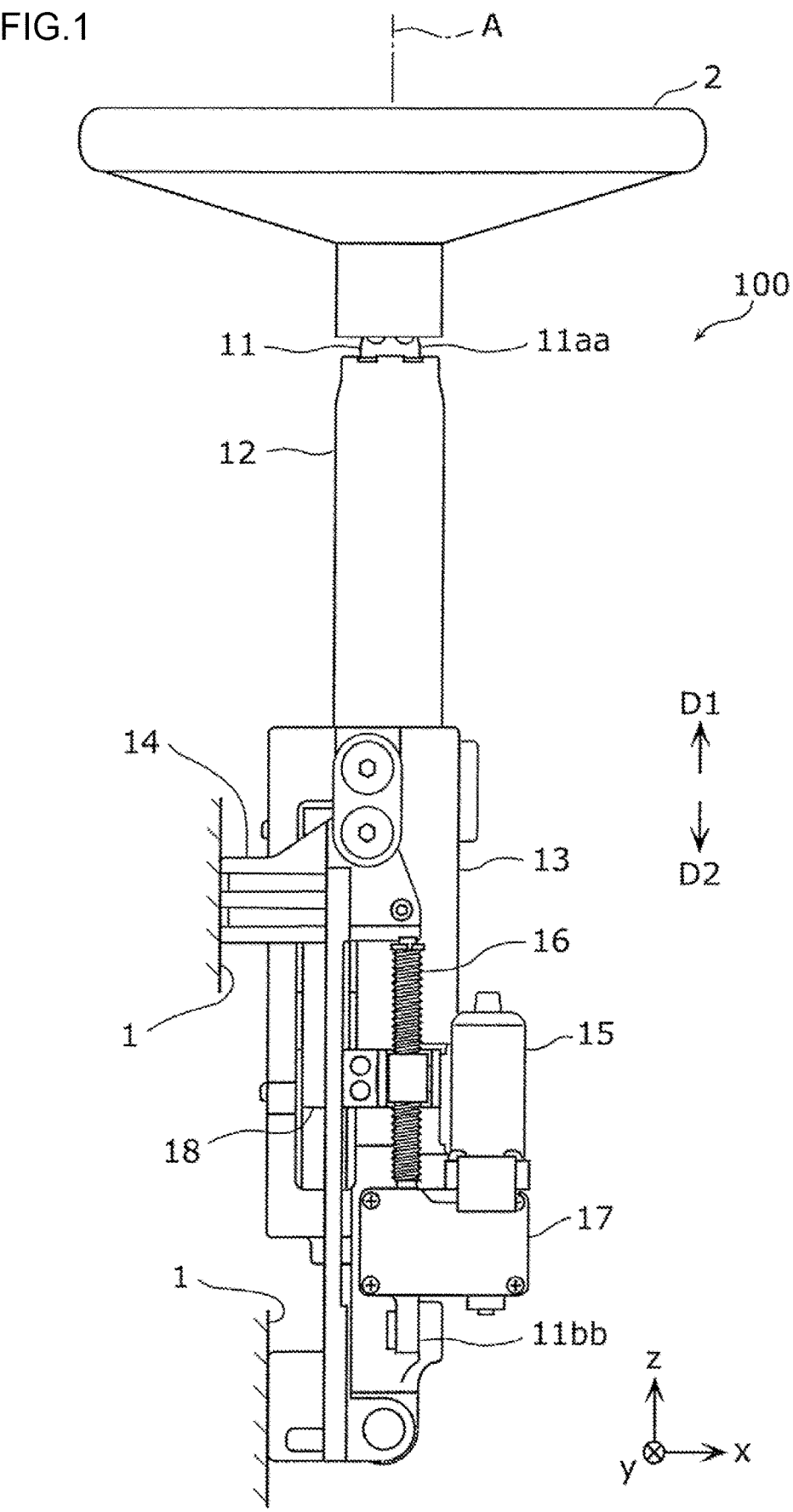
FIG. 1 is a schematic external side view of a steering system according to a first embodiment.

FIG. 1 is a schematic external side view of the steering system 100 according to the first embodiment. The steering system 100 includes a steering shaft 11, a tube 12, a housing 13, and a mount base 14. The tube 12 supports the steering shaft 11 such that the steering shaft 11 is rotatable. The housing 13 supports the tube 12 such that the tube 12 is slidably movable in axial directions along an axis A of a steering shaft 11. The mount base 14 fixes the housing 13 to a mount portion 1 of a vehicle body. The steering system 100 further includes a motor 15, a converter 16, and a speed reducer 17. The motor 15 moves the tube 12 in the axial directions. The converter 16 converts a rotational driving force of the motor 15 to a linear driving force in the axial directions. The speed reducer 17 reduces the speed of the rotational driving force of the motor 15 and then transmits the rotational driving force to the converter 16. The steering system 100 further includes the following: a movable member 18 that transmits the linear driving force from the converter 16 to the tube 12; and an energy absorbing member 20 (refer to FIG. 2).

A first end 11aa of the steering shaft 11 is coupled to the steering wheel 2, and a second end 11bb of the steering shaft 11 is coupled to a steering mechanism. The steering shaft 11 transmits rotation of the steering wheel 2 to the steering mechanism and is made of a material with torsional stiffness and strength. For example, the steering shaft 11 is made of metal, such as iron. The steering shaft 11 is inserted through the tube 12.

The tube 12 has a cylindrical shape and extends in the axial directions to encompass the outer circumference of the steering shaft 11. The tube 12 supports the steering shaft 11 such that the steering shaft 11 is rotatable about the axis A. The steering shaft 11 is immovable relative to the tube 12 in the axial directions. Thus, the tube 12 is movable along with the steering shaft 11 in the axial directions. The tube 12, which supports the steering shaft 11, is made of a material with stiffness and strength. For example, the tube 12 is made of metal, such as iron. According to the first embodiment, the steering shaft 11 and the tube 12 are concentrically arranged relative to each other about the axis A. Alternatively, the axis of the tube 12 may be displaced from the axis A of the steering shaft 11. The tube 12 is not limited to a cylindrical shape and may have any shape that supports the steering shaft 11 such that the steering shaft 11 is rotatable about the axis A. The steering shaft 11 needs to be immovable relative to the tube 12 the axial directions. The tube 12 is an example of a supporting member.

The axial directions along the axis A are defined as z-axis directions. Of the z-axis directions, one direction that is from the second end 11bb to the first end 11aa is defined as a positive z-axis direction, and the opposite direction that is from the first end 11aa to the second end 11bb is defined as a negative z-axis direction. As described later, the steering shaft 11 is telescopically extendable and retractable in the z-axis directions. Directions that are perpendicular to the z-axis directions and that are from one of the steering shaft 11 and the mount portion 1 to the other of the steering shaft 11 and the mount portion 1 are defined as x-axis directions. Of the x-axis directions, one direction that is from the mount portion 1 to the steering shaft 11 is defined as a positive x-axis direction, and the opposite direction that is from the steering shaft 11 to the mount portion 1 is defined as a negative x-axis direction. Directions that are perpendicular to both the x-axis directions and the z-axis directions are defined as y-axis directions. Of the y-axis directions, one direction that is from the front to the back of the sheet having FIG. 1 is defined as a positive y-axis direction, and the opposite direction that is from the back to the front of the sheet having FIG. 1 is defined as a negative y-axis direction.

Figure 2:
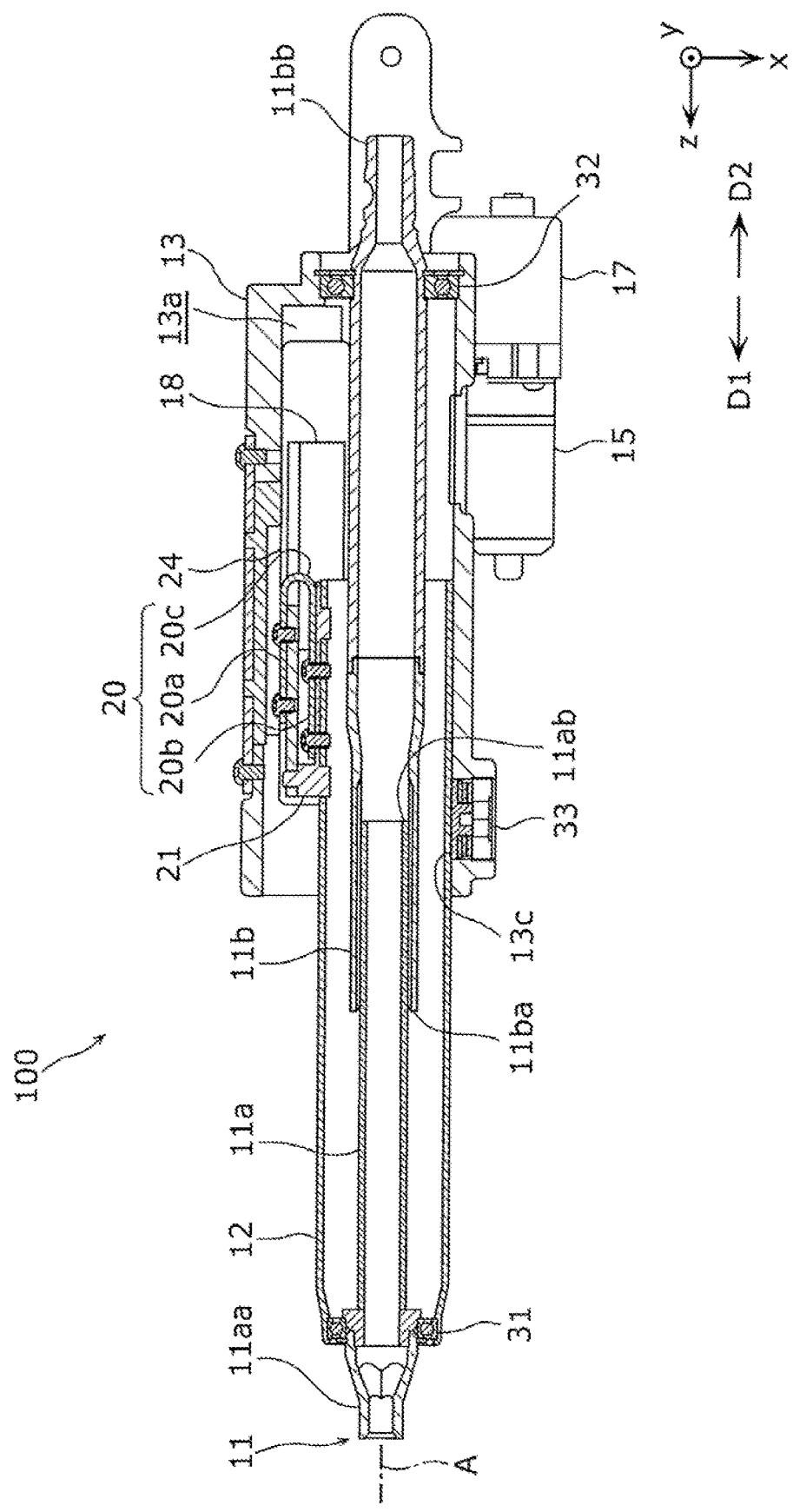
FIG. 2 is a schematic side cross-sectional view of the steering system in FIG. 1, taken along an axis of a steering shaft.

FIG. 2 is a schematic side cross-sectional view of the steering system 100 in FIG. 1, taken along the axis A of the steering shaft 11. Specifically, FIG. 2 illustrates a cross section of the steering system 100 in FIG. 1, when viewed in the negative y-axis direction, taken along a plane that includes the axis A and that is parallel to a xz-plane defined by the x-axis directions and the z-axis directions. For the sake of simplicity, the illustration of FIG. 2 omits the mount base 14. As illustrated in FIG. 1 and FIG. 2, the steering shaft 11 includes a cylindrical upper shaft 11a and a cylindrical lower shaft 11b. A first end of the upper shaft 11a forms the first end 11aa of the steering shaft 11. A second end 11ab of the upper shaft 11a is inserted in a first end 11ba of the lower shaft 11b. A second end of the lower shaft 11b forms the second end 11bb of the steering shaft 11. The second end 11ab has a splined outer circumferential surface. The first end 11ba has a splined inner circumferential surface. The upper shaft 11a and the lower shaft 11b are splined together. Thus, the upper shaft 11a is not rotatable relative to the lower shaft 11b about the axis A, but is slidably movable relative to the lower shaft 11b in the axial directions. Alternatively, the first end 11ba may be inserted in the second end flab.

A bearing 31 is mounted on the inner circumferential surface of the tube 12 at a position near the first end 11aa. The tube 12 supports the upper shaft 11a through the bearing 31 so that the upper shaft 11a is rotatable about the axis A. The bearing 31 fixes the upper shaft 11a so that the upper shaft 11a is immovable relative to the tube 12 in the axial directions. A bearing 32 is mounted to the housing 13 at a position near the second end 11bb. The housing 13 supports the lower shaft 11b through the bearing 32 so that the lower shaft 11b is rotatable about the axis A. The bearing 32 fixes the lower shaft 11b so that the lower shaft 11b is immovable relative to the housing 13 in the axial directions. The bearings 31 and 32 may be, for example, rolling bearings.

The upper shaft 11a and the lower shaft 11b are rotatable together, as a unit, about the axis A relative to the tube 12 and the housing 13. The upper shaft 11a is slidable together with the tube 12, as a unit, relative to the lower shaft 11b and the housing 13 in the axial directions. Thus, the steering shaft 11 is telescopically extendable and retractable. The tube 12 moves with the telescopic movement of the steering shaft 11, specifically, the telescopic movement of the upper shaft 11a.

The mount base 14 is fixed to the mount portion 1 that is located in the negative x-axis direction crossing the axis A. Thus, the mount base 14 fixes the housing 13 to the mount portion 1. The mount base 14 is made of a material with stiffness and strength. For example, the mount base 14 is made of metal, such as iron or aluminum alloy, or hard resin. According to the first embodiment, the mount base 14 has a frame shape to reduce its size and weight. The housing 13 has a tubular shape defining an inside space 13a that is open in the positive z-axis direction and in the negative z-axis direction. The steering shaft 11, the tube 12, and the energy absorbing member 20 are held in the inside space 13a. The housing 13 supports the steering shaft 11 from the side, with respect to the axis A, through the tube 12. The housing 13 is made of a material with stiffness and strength. For example, the housing 13 is made of metal, such as aluminum alloy, or hard resin.

Figure 3:
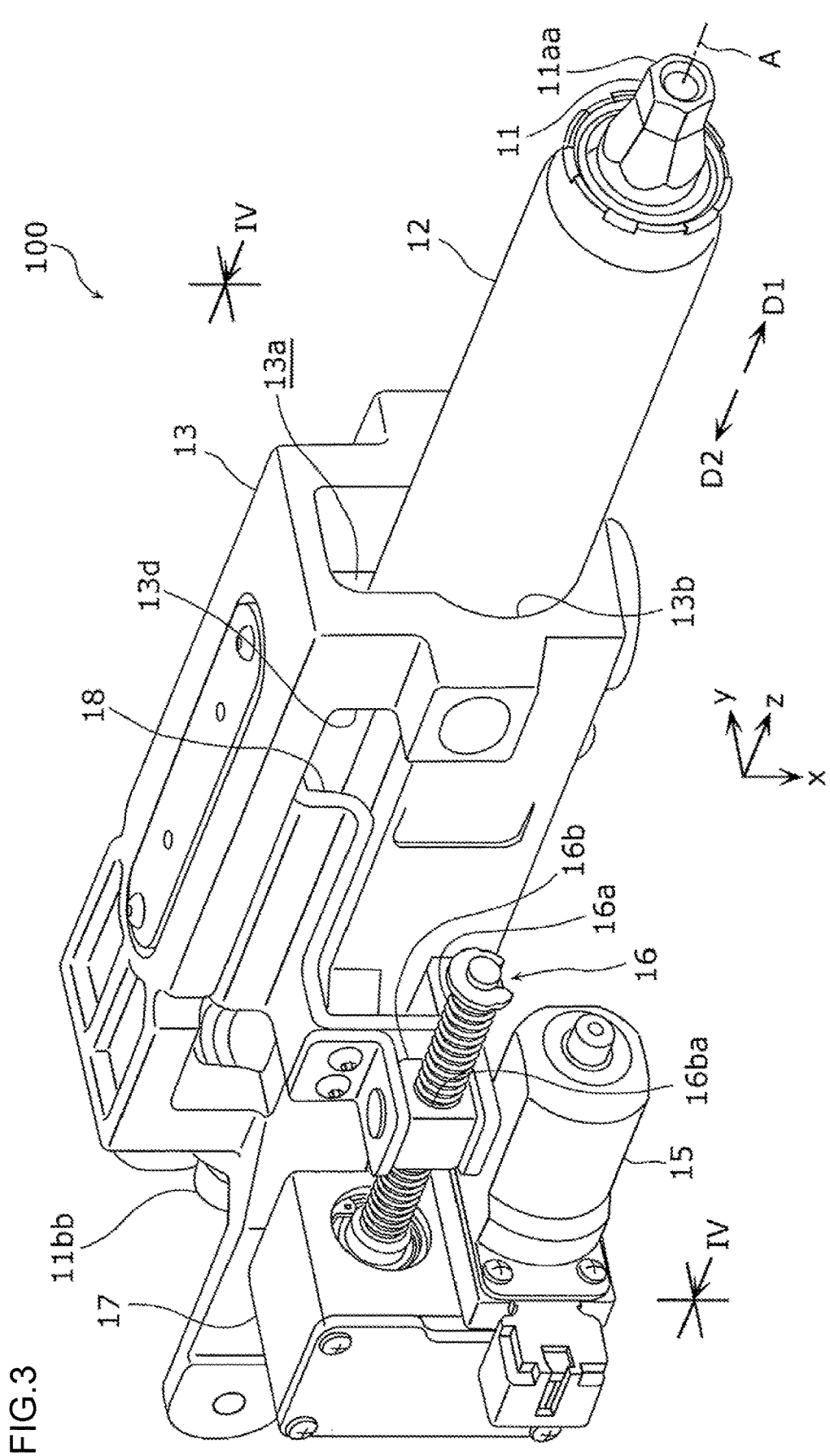
FIG. 3 is a schematic perspective view of the steering system in FIG. 2, when viewed in a direction from one end to the other end of the steering shaft.

As illustrated in FIG. 2 and FIG. 3, the steering shaft 11 passes through the inside space 13a and protrudes outside the housing 13 through the two openings. The tube 12 extends from the inside space 13a to the outside of the housing 13 through a support hole 13b in the housing 13. The support hole 13b forms one of the two openings that is located closer to the first end 11aa of the steering shaft 11 than the other opening. FIG. 3 is a schematic perspective view of the steering system 100 in FIG. 2, when viewed in a direction from the first end 11aa to the second end 11bb of the steering shaft 11.

Figure 4:
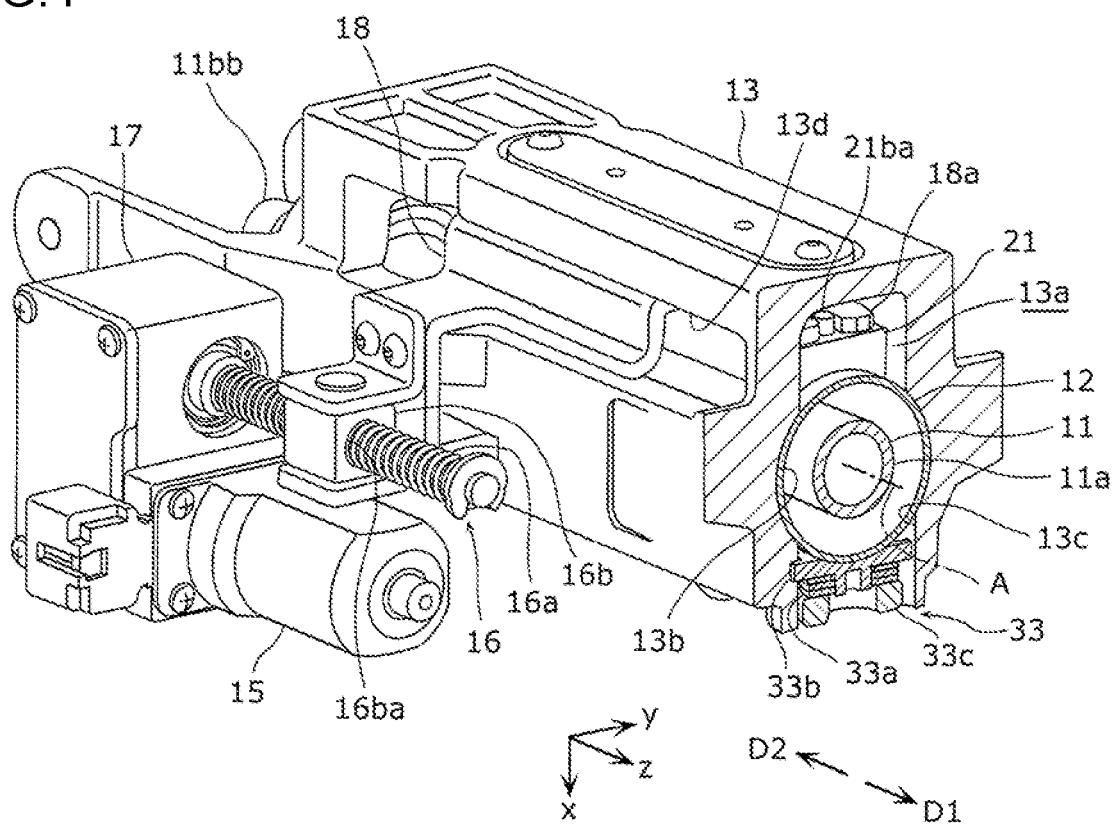
FIG. 4 is a schematic perspective cross-sectional view of the steering system in FIG. 3, when viewed in a direction IV, taken along a plane that is perpendicular to the axis and that cuts the steering shaft and a tube.
Figure 5:
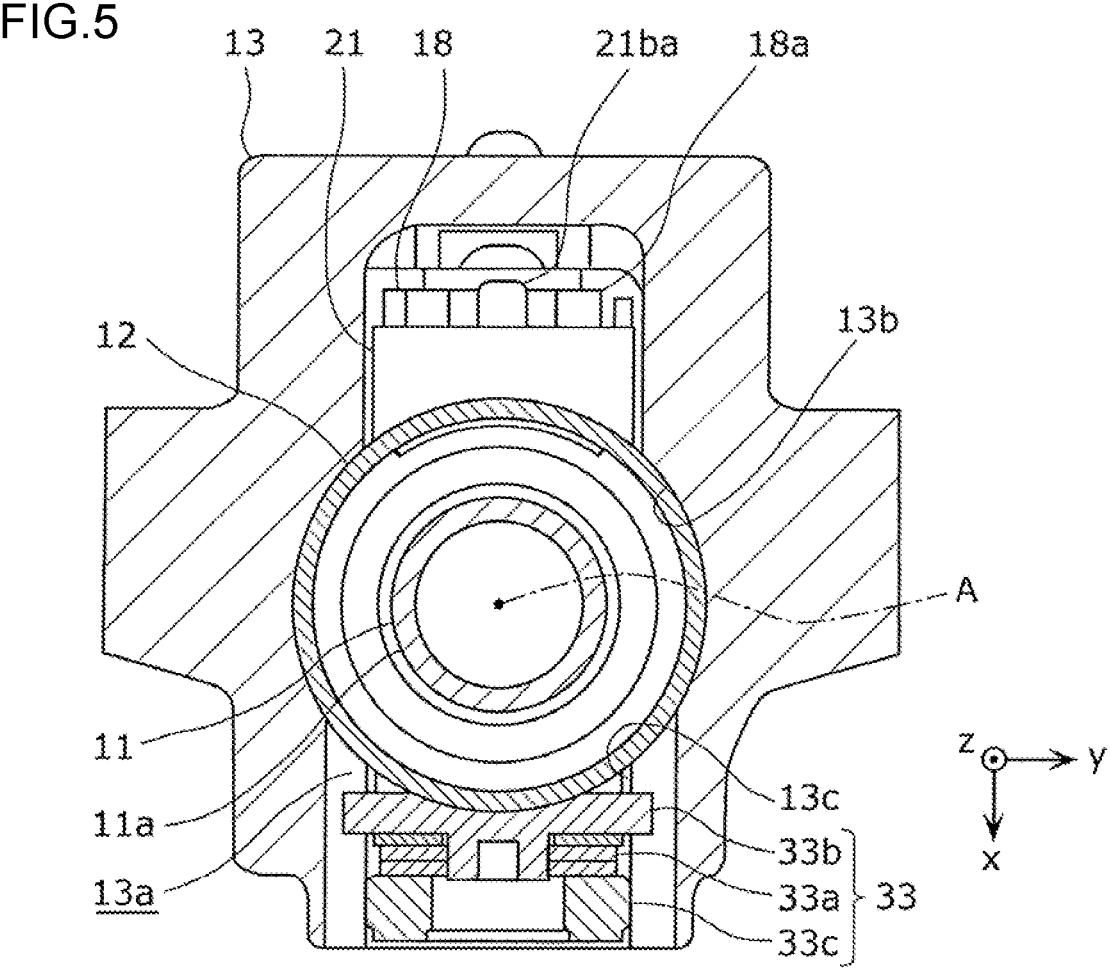
FIG. 5 is a schematic front view of FIG. 4 and illustrates the cross section.

As illustrated in FIGS. 2, 4, and 5, a biasing member 33 is embedded in an inner circumferential surface of the support hole 13b in the positive x-axis direction with respect to the tube 12. FIG. 4 is a schematic perspective cross-sectional view of the steering system 100 in FIG. 3, when viewed in a direction IV, taken along a plane that is perpendicular to the axis A and that cuts the steering shaft 11 and the tube 12. FIG. 5 is a schematic front view of FIG. 4 and illustrates the cross section.

The biasing member 33 is held in a side hole 13c that extends from the inner circumferential surface of the support hole 13b in a radial direction coincident with the positive x-axis direction. The biasing member 33 presses the outer circumferential surface of the tube 12 toward the axis A, specifically, toward the inner circumferential surface of the support hole 13b that is located across the tube 12 from the biasing member 33. Since the tube 12 is pressed against the inner circumferential surface of the support hole 13b, a sliding resistance between the tube 12 and the inner circumferential surface of the support hole 13b increases. The inner circumferential surface of the support hole 13b is an example of a sliding surface on which the tube 12 is slidably movable.

Changing a pressing force by which the biasing member 33 presses the tube 12 changes the sliding resistance. Thus, the biasing member 33 is provided to control the sliding resistance. According to the first embodiment, a pressing direction in which the biasing member 33 presses the tube 12 is substantially perpendicular to the axis A and is toward the axis A. Alternatively, the pressing direction may be any direction that enables the biasing member 33 to press the tube 12 against the inner circumferential surface of the support hole 13b. The biasing member 33 includes an abutment member 33b, a spring 33a, and a spring washer 33c. The abutment member 33b is in surface contact with the tube 12. The spring 33a presses the abutment member 33b toward the tube 12. The spring 33a is sandwiched between the abutment member 33b and the spring washer 33c. The spring washer 33c engages with the inner circumferential surface of the side hole 13c, thereby being fixed in place. According to the embodiment, the spring 33a is a disc spring and thus occupies less space. Alternatively, the spring 33a may be any other type of spring, such as a coil spring.

As illustrated in FIG. 3, the motor 15 and the speed reducer 17 are fixed to the outside of the housing 13. A threaded shaft 16a of the converter 16 extends from the speed reducer 17. The threaded shaft 16a is a straight rod-shaped member and has an outer circumferential surface provided with an external thread. The threaded shaft 16a is fixed and immovable relative to the housing 13 in the x-axis, y-axis, and x-axis directions. A rotating shaft (not shown) of the motor 15 and the threaded shaft 16a are arranged parallel to each other and extend from the speed reducer 17 in the same direction, specifically, in the positive z-axis direction. Thus, the speed reducer 17, the motor 15, and the threaded shaft 16a are structured to occupy less space. The speed reducer 17 includes the following: a first gear that rotates unitarily with the rotating shaft of the motor 15; a second gear that is located at one end of the threaded shaft 16a and rotates unitarily with the threaded shaft 16a; and a third gear that meshes with the first gear and the second gear. The speed reducer 17 transmits the rotational driving force of the motor 15 to the threaded shaft 16a, while amplifying the rotational driving force and reducing the speed of the rotational driving force. The rotational driving force from the speed reducer 17 rotates the threaded shaft 16a in directions about an axis of the thread. As the rotational direction of the motor 15 changes, the rotational direction of the threaded shaft 16a changes correspondingly. According to the first embodiment, the motor 15 is an electric motor. Alternatively, the motor 15 may be any other type of motor, such as a hydraulic motor.

The converter 16 has a screw-hole member 16b in addition to the threaded shaft 16a. The screw-hole member 16b has an internally threaded hole 16ba that threadedly engages with the external thread of the threaded shaft 16a and that goes through the screw-hole member 16b. The rotation of the threaded shaft 16a causes the screw-hole member 16b threadedly engaging with the threaded shaft 16a to move linearly on the threaded shaft 16a in the axial directions, for example, in the z-axis directions. The screw-hole member 16b reciprocates on the threaded shaft 16a in accordance with the rotational direction of the threaded shaft 16a. Thus, the converter 16 converts the rotational driving force from the motor 15 to a linear driving force that linearly moves the screw-hole member 16b. The threaded shaft 16a and the screw-hole member 16b are made of any suitable material. According to the first embodiment, the threaded shaft 16a is made of a material with stiffness and strength. For example, the threaded shaft 16a is made of metal, such as iron. On the other hand, the screw-hole member 16b is made of metal, such as iron or aluminum alloy, or resin.

Figure 6:
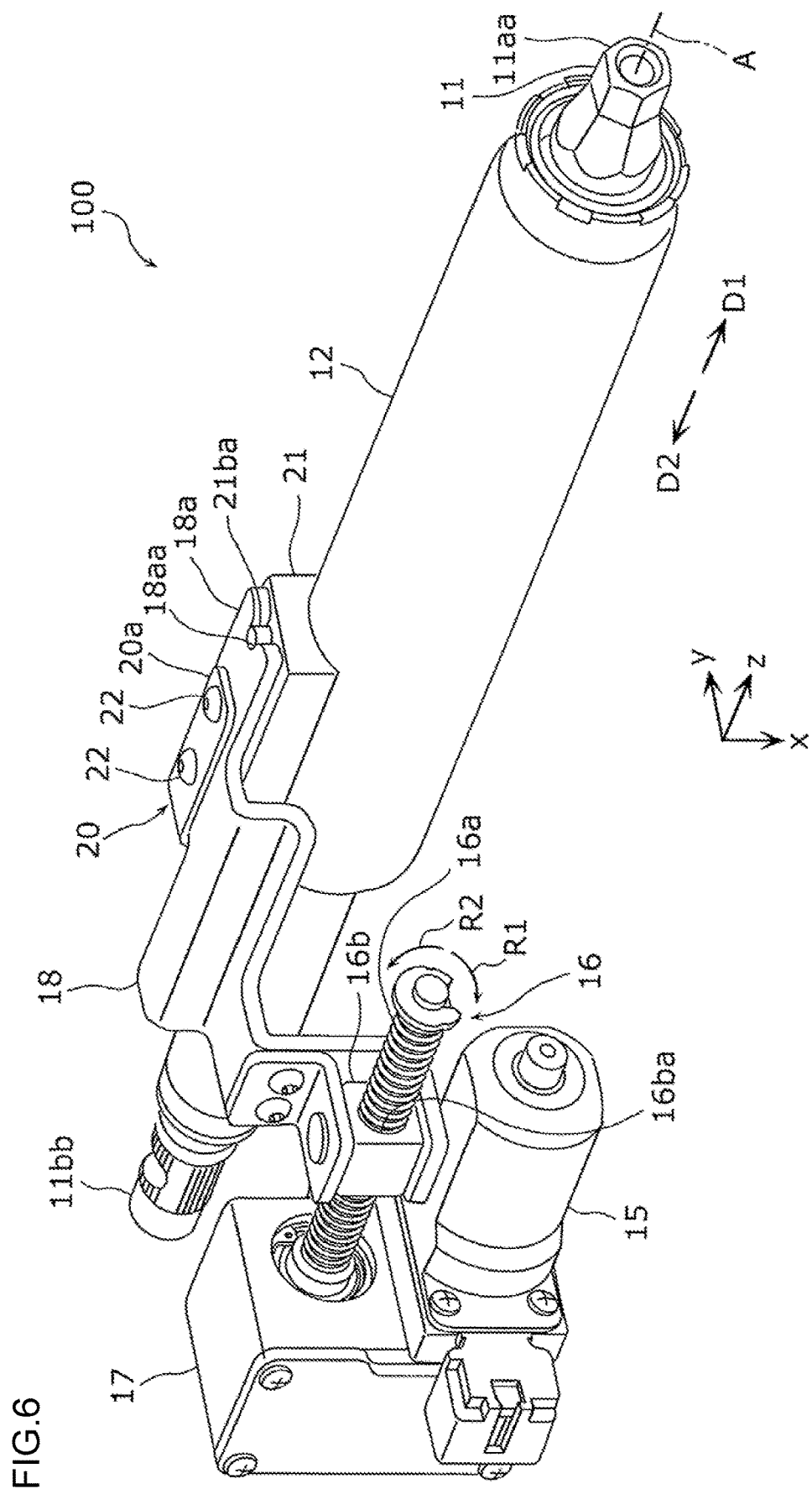
FIG. 6 is a schematic perspective view of the steering system in FIG. 3 without a housing.

As illustrated in FIG. 3 and FIG. 6, the movable member 18 couples the screw-hole member 16b and the energy absorbing member 20 together. FIG. 6 is a schematic perspective view of the steering system 100 in FIG. 3 without the housing 13. The movable member 18 extends from the screw-hole member 16b into the inside space 13a by passing through an opening 13d in one side of the housing 13. The movable member 18 is fixed to the screw-hole member 16b and the energy absorbing member 20. The movable member 18 has a flat plate portion 18a at one end. The flat plate portion 18a is connected to the movable member 18. The movable member 18 moves unitarily with the screw-hole member 16b that reciprocates in accordance with the rotational direction of the threaded shaft 16a, thereby transmitting the linear driving force converted by the converter 16 to the energy absorbing member 20. In other words, the movable member 18 moves the tube 12 connected to the energy absorbing member 20 by being moved by the driving force of the motor 15. The movable member 18 is made of a material with stiffness and strength. For example, the movable member 18 is made of metal, such as iron or aluminum alloy.

Figure 7:
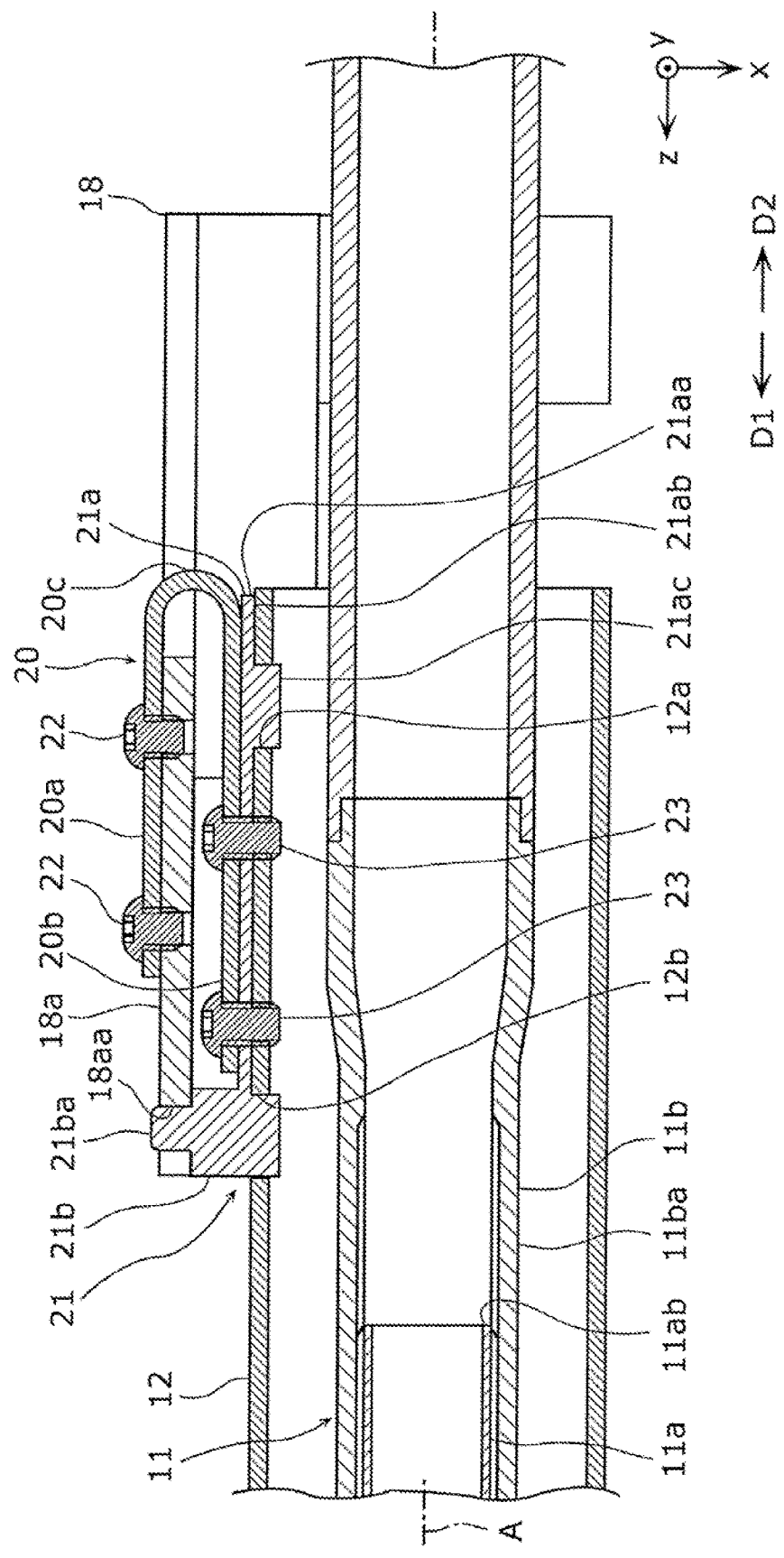
FIG. 7 is a schematic partial enlarged side cross-sectional view of FIG. 2 and illustrates details of an energy absorbing member.

As illustrated in FIGS. 2, 6, and 7, the energy absorbing member 20 is connected both to the movable member 18 and to the tube 12. The energy absorbing member 20 unitarily includes a first fixation portion 20a, a second fixation portion 20b, and a joint portion 20c. The first fixation portion 20a is fixed to the flat plate portion 18a of the movable member 18. The second fixation portion 20b is fixed to the tube 12. The joint portion 20c joins the first fixation portion 20a and the second fixation portion 20b together. FIG. 7 is a schematic partial enlarged side cross-sectional view of FIG. 2 and illustrates details of the energy absorbing member 20. According to the first embodiment, the energy absorbing member 20 is a strip member made of plastically deformable metal, such as iron. The energy absorbing member 20 is not limited to such a strip shape. For example, the energy absorbing member 20 may have a rod shape, a tubular shape, a grooved shape such as a U-shape, or any other shape. Each of the first fixation portion 20a and the second fixation portion 20b has a rectangular flat plate shape. The first fixation portion 20a and the second fixation portion 20b are located facing each other in the negative x-axis direction, i.e., in a direction laterally away from the tube 12. The joint portion 20c has a plate shape and is convexly curved in the negative z-axis direction. The joint portion 20c is unitarily joined at one end to one end of the first fixation portion 20a and at the other end to one end of the second fixation portion 20b. The one ends of the first fixation portion 20a and the second fixation portion 20b are located facing each other. Thus, the energy absorbing member 20 is a one-piece member and has the same structure as a member that is formed by curving a strip in a U-shape.

The first fixation portion 20a and the second fixation portion 20b are arranged such that their longitudinal directions are along the z-axis directions, i.e., along telescopic directions of the tube 12. The telescopic directions are directions in which the tube 12 moves to extend and retract the steering shaft 11. The telescopic directions include an extension direction D1 and a retraction direction D2. The tube 12 moves in the extension direction D1 when extending the steering shaft 11. The tube 12 moves in the retraction direction D2 when retracting the steering shaft 11. According to the first embodiment, the joint portion 20c is located downstream of the first fixation portion 20a and the second fixation portion 20b in the negative z-axis direction, i.e., in the retraction direction D2. Alternatively, the joint portion 20c may be located downstream of the first fixation portion 20a and the second fixation portion 20b in the positive z-axis direction.

A limiter member 21 is provided adjacent to the energy absorbing member 20. The limiter member 21 unitarily includes an interposition portion 21a and an engagement portion 21b. The interposition portion 21a is interposed between the second fixation portion 20b and the tube 12. The engagement portion 21b engages with the flat plate portion 18a of the movable member 18. The interposition portion 21a includes a curved surface 21aa and a flat surface 21ab. The curved surface 21aa is curved to follow the shape of the outer circumferential surface of the tube 12. The flat surface 21ab is located opposite to the curved surface 21aa. The interposition portion 21a is disposed such that the curved surface 21aa is in surface contact with the outer circumferential surface of the tube 12 and such that the flat surface 21ab is in surface contact with the second fixation portion 20b. The interposition portion 21a enables the second fixation portion 20b to be stably mounted on the outer circumferential surface of the tube 12. The interposition portion 21a has a projection 21ac that projects from the curved surface 21aa. The projection 21ac is inserted and fitted in a first engagement hole 12a that penetrates a cylindrical wall of the tube 12.

The engagement portion 21b is located downstream of the interposition portion 21a in the positive z-axis direction. The engagement portion 21b is inserted and fitted in a second engagement hole 12b that penetrates the cylindrical wall of the tube 12. The engagement portion 21b unitarily includes an engagement projection 21ba that projects in the negative x-axis direction, i.e., in a direction from the second fixation portion 20b to the first fixation portion 20a. According to the first embodiment, the cross section of the engagement projection 21ba taken along a yz-plane defined by the y-axis directions and the z-axis directions is smaller than the cross section of the other part of the engagement portion 21b taken along the yz-plane. Accordingly, a shear resistance of the engagement projection 21ba is less than a shear resistance of the other part of the engagement portion 21b. The engagement projection 21ba is located downstream of the flat plate portion 18a and the first fixation portion 20a in the positive z-axis direction, i.e., in the extension direction D1 of the tube 12, and engages with an edge of the flat plate portion 18a. Specifically, as illustrated in FIG. 6, the engagement projection 21ba engages with a recess 18aa that is formed in the edge of the flat plate portion 18a that faces toward the positive z-axis direction. The recess 18aa is recessed in the negative z-axis direction and is in line or surface contact with the engagement projection 21ba at least one position. As already described, the tube 12 moves in the extension direction D1 when extending the steering shaft 11. The engagement portion 21b limits the movement of the movable member 18 relative to the tube 12 in the extension direction D1.

The limiter member 21 is made of a material having less strength than those of the tube 12 and the movable member 18. For example, the limiter member 21 is made of resin. The resin for the limiter member 21 may be, but not limited to, hard resin. As described above, the interposition portion 21a and the engagement portion 21b are unitarily formed as one piece. Alternatively, the interposition portion 21a and the engagement portion 21b may be separate pieces. In this case, the engagement portion 21b may be the only part of the limiter member 21 that is made of a material having less strength than those of the tube 12 and the movable member 18.

The interposition portion 21a of the limiter member 21 and the second fixation portion 20b of the energy absorbing member 20 are both fixed to the tube 12 by second fasteners 23, such as screws. The second fasteners 23 penetrate the interposition portion 21a and the second fixation portion 20b. According to the first embodiment, two second fasteners 23 are aligned in the z-axis directions. The projection 21ac of the interposition portion 21a and the engagement portion 21b are inserted respectively in the first engagement hole 12a and the second engagement hole 12b so that the limiter member 21 is fixed in position relative to the tube 12. The projection 21ac and the engagement portion 21b limit displacement of the limiter member 21 along the outer circumferential surface of the tube 12, thus helping to fix the limiter member 21 to the tube 12 more firmly. If the energy absorbing member 20 is fixed to the tube 12 by one second fastener 23, the energy absorbing member 20 may rotate about the second fastener 23 on the outer circumferential surface of the tube 12. Using two or more second fasteners 23 helps to prevent the rotation of the energy absorbing member 20 and thus to maintain the position and orientation of the energy absorbing member 20 relative to the tube 12. The number of the second fasteners 23, i.e., the number of positions at which the interposition portion 21a and the second fixation portion 20b are fixed to the tube 12 be preferably two or more, but alternatively may be one. The second fasteners 23 may be aligned in directions other than the z-axis directions.

The first fixation portion 20a of the energy absorbing member 20 and the flat plate portion 18a of the movable member 18 are fixed together by first fasteners 22, such as screws, that penetrate at least one of the first fixation portion 20a and the flat plate portion 18a. According to the first embodiment, two first fasteners 22 are aligned in the z-axis directions. If the first fixation portion 20a and the flat plate portion 18a are fixed together by one first fastener 22, the first fixation portion 20a and the flat plate portion 18a may rotate relative to each other about the first fastener 22. Using two or more first fasteners 22 helps to prevent the relative rotation and thus to maintain the relative position and orientation between the energy absorbing member 20 and the movable member 18. The number of the first fasteners 22, i.e., the number of positions where the first fixation portion 20a is fixed to the flat plate portion 18a be preferably two or more, but alternatively may be one. The first fasteners 22 may be aligned in directions other than the z-axis directions. The flat plate portion 18a is located between the first fixation portion 20a and the second fixation portion 20b. The engagement portion 21b of the limiter member 21 that engages with the movable member 18 limits deformation of the energy absorbing member 20 that is caused by displacement of the first fixation portion 20a relative to the second fixation portion 20b in the positive z-axis direction.

A presser member 24 is fixed to a wall portion of the housing 13 that faces the first fixation portion 20a. Specifically, the presser member 24 is fixed to a lid plate that covers an opening in the wall portion of the housing 13. The presser member 24 is in contact with, specifically, in surface contact with the first fixation portion 20a to limit displacement of the first fixation portion 20a in the negative x-axis direction, i.e., in a direction away from the second fixation portion 20b.

According to the structure described above, when the motor 15 is driven to rotate such that the threaded shaft 16a rotates in a clockwise direction R1 illustrated in FIG. 6, the screw-hole member 16b and the movable member 18 move in the positive z-axis direction, i.e., in the extension direction D1 to extend the steering shaft 11. Accordingly, the flat plate portion 18a of the movable member 18 applies a force in the extension direction D1 to the first fixation portion 20a of the energy absorbing member 20 and to the engagement portion 21b of the limiter member 21. The tube 12 receives the force in the extension direction D1 through the energy absorbing member 20 and the limiter member 21, thus moving slidingly in the extension direction D1. At this time, the upper shaft 11a of the steering shaft 11 moves together with the tube 12 in the extension direction D1, so that the steering shaft 11 extends.

To cause the tube 12 to move synchronously with the movement of the movable member 18, the energy absorbing member 20 has a stiffness that moves the tube 12 by transmitting the driving force of the motor 15 from the movable member 18 to the tube 12. Preferably, the stiffness enable the energy absorbing member 20 to remain undeformed when the tube 12 is moved by a telescopic position adjustment that adjusts the distance between a driver and the steering wheel 2 using the driving force of the motor 15. Specifically, displacements of the first fixation portion 20a and the second fixation portion 20b of the energy absorbing member 20 in a direction away from each other are not allowed by the presser member 24 and the tube 12. This makes it likely that the joint portion 20c is deformed. In the energy absorbing member 20, if the joint portion 20c is deformed, for example, the first fixation portion 20a may be displaced relative to the second fixation portion 20b in the z-axis directions. Therefore, it is preferable that the stiffness of the energy absorbing member 20 enable the joint portion 20c to remain undeformed.

When the tube 12 is moved in the extension direction D1, a static friction force or a dynamic friction force acts between the tube 12 and the housing 13, for example, inside the support hole 13b. These friction forces are exerted on the tube 12 as the sliding resistance. When the sum of the shear resistance of the engagement projection 21ba of the engagement portion 21b and a bending resistance of the joint portion 20c of the energy absorbing member 20 is greater than or equal to the sliding resistance exerted on the tube 12, the joint portion 20c remains undeformed. For this reason, the joint portion 20c is structured to have a bending resistance, i.e., a bending stiffness that is greater than or equal to a force calculated by subtracting the shear resistance of the engagement projection 21ba of the engagement portion 21b from the sliding resistance exerted on the tube 12. The bending resistance of the joint portion 20c increases with a decrease in the radius of the curved section of the joint portion 20c, and also increases with an increase in the thickness of the joint portion 20c. For example, the bending resistance of the joint portion 20c may be controlled on the basis of the radius of the curved section.

On the other hand, when the motor 15 is driven to rotate such that the threaded shaft 16a rotates in a counterclockwise direction R2 illustrated in FIG. 6, the screw-hole member 16b and the movable member 18 move in the negative z-axis direction, i.e., in the retraction direction D2 to retract the steering shaft 11. Accordingly, the flat plate portion 18a of the movable member 18 applies a force in the retraction direction D2 to the first fixation portion 20a of the energy absorbing member 20. The tube 12 receives the force in the retraction direction D2 through the energy absorbing member 20, thus moving slidingly in the retraction direction D2. At this time, the upper shaft 11a of the steering shaft 11 moves together with the tube 12 in the retraction direction D2, so that the steering shaft 11 retracts.

To cause the tube 12 to move synchronously with the movement of the movable member 18, it is preferable that the energy absorbing member 20, in particular, the joint portion 20c remain undeformed during the telescopic position adjustment. When the tube 12 is moved in the retraction direction D2, a static or dynamic friction force acting between the tube 12 and the housing 13 is exerted on the tube 12 as the sliding resistance. When the bending resistance of the joint portion 20c is greater than or equal to the sliding resistance exerted on the tube 12, the joint portion 20c remains undeformed. For this reason, the joint portion 20c is structured to have a bending resistance, i.e., a bending stiffness that is greater than or equal to the sliding resistance exerted on the tube 12. In conclusion, the joint portion 20c has a stiffness that enables the energy absorbing member 20 to move the tube 12 against the sliding resistance.

The energy absorbing member 20 with such a bending stiffness allows the steering shaft 11 to extend synchronously with the movement of the movable member 18 in the extension direction D1 caused by the rotational driving force of the motor 15. Further, the energy absorbing member 20 allows the steering shaft 11 to retract synchronously with the movement of the movable member 18 in the retraction direction D2 caused by the rotational driving force of the motor 15.

Next, how the steering system 100 operates in the event of a secondary collision is described. Referring to FIGS. 1, 2, and 7, when a vehicle equipped with the steering system 100 collides with another object, such as another vehicle, the collision may cause a secondary collision between a driver of the vehicle and the steering wheel 2. When the secondary collision occurs, an impact force in the retraction direction D2 is applied to the steering shaft 11 through the steering wheel 2. The impact force acts to move the tube 12 in the retraction direction D2. As a result, the engagement projection 21ba of the limiter member 21 receives a shear force in the extension direction D1 from the flat plate portion 18a of the movable member 18. The joint portion 20c of the energy absorbing member 20 receives a bending force that acts to displace the second fixation portion 20b relative to the first fixation portion 20a in the retraction direction D2.

Figure 8:
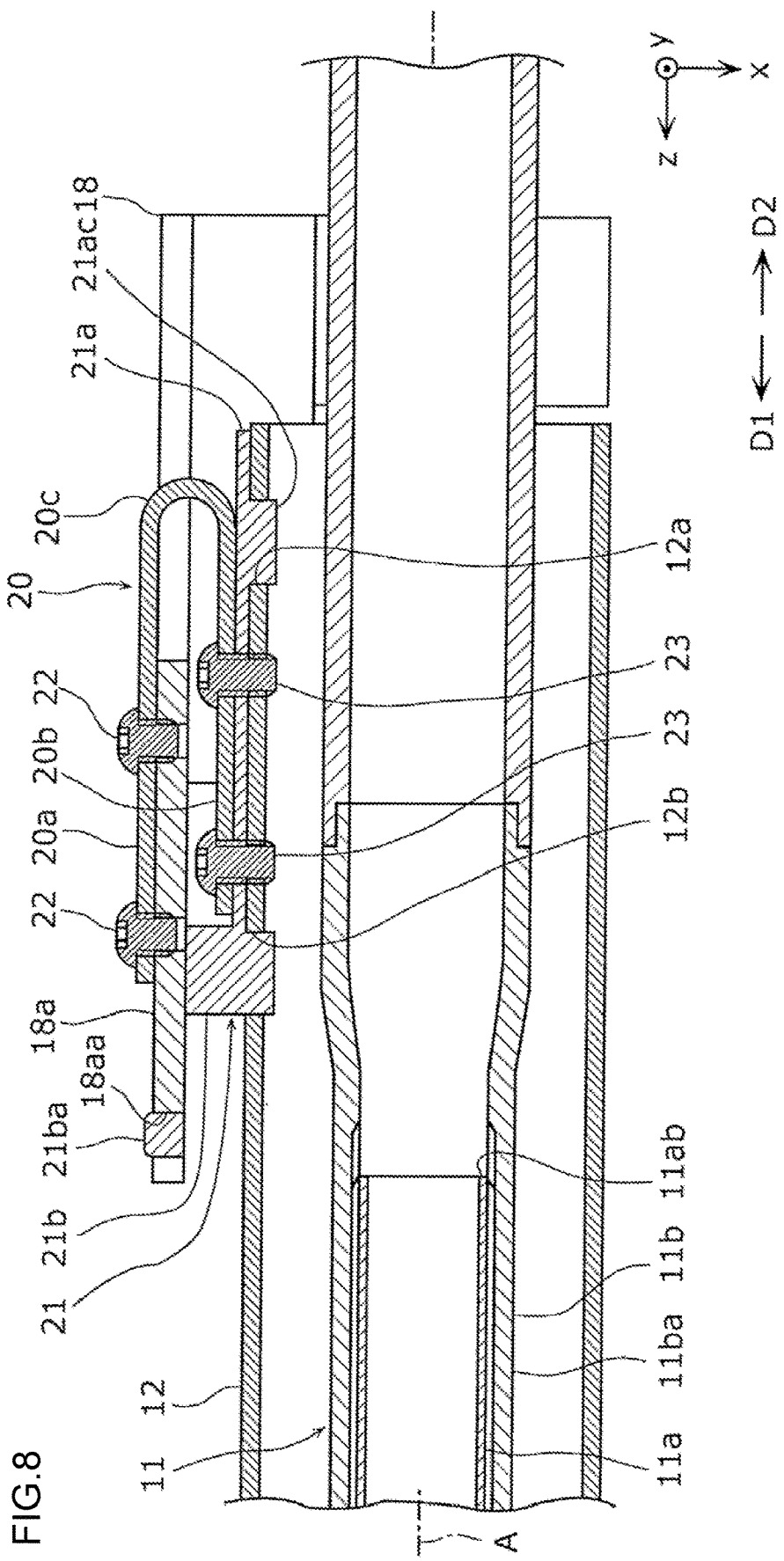
FIG. 8 is a schematic side cross-sectional view illustrating a condition of the steering system in FIG. 7 when a secondary collision occurs.

The shear resistance of the engagement projection 21ba and the bending resistance of the joint portion 20c are preset such that their sum is less than the impact force described above. For example, the engagement projection 21ba is structured to have a strength that allows the engagement projection 21ba to be broken by the shear force in the extension direction D1 associated with the impact force. Thus, as illustrated in FIG. 8, the engagement projection 21ba is broken by the impact force, thereby allowing deformation of the energy absorbing member 20. After that, the joint portion 20c is plastically deformed by the impact force such that the second fixation portion 20b is displaced relative to the first fixation portion 20a in the retraction direction D2. FIG. 8 is a schematic side cross-sectional view illustrating a condition of the steering system 100 in FIG. 7 when the secondary collision occurs. At this time, the curved section of the joint portion 20c moves on the energy absorbing member 20 toward the second fixation portion 20b. In other words, as the deformation of the energy absorbing member 20 progresses, a distance from the first fastener 22 to the curved section increases, and a distance from the second fastener 23 to the curved section decreases. The tube 12 moves in the retraction direction D2 with the progress of the deformation of the energy absorbing member 20. The energy absorbing member 20 absorbs the impact energy by being plastically deformed. As described above, the energy absorbing member 20 is deformed synchronously with the movement of the tube 12 during the secondary collision. Thus, the energy absorbing member 20 absorbs of the impact energy applied to the steering wheel 2 while moving the steering wheel 2 in the retraction direction D2. In this way, the energy absorbing member 20 reduces and damps an impact that a driver receives from the steering wheel 2.

As described above, according to the first embodiment, the steering system 100 is telescopically extendable and retractable using the driving force of the motor 15. The steering system 100 includes the motor 15, the telescopic steering shaft 11, the tube 12, the energy absorbing member 20, and the movable member 18. The tube 12 is a supporting member that supports the steering shaft 11 such that the steering shaft 11 is rotatable and that is movable with telescopic movement of the steering shaft 11. The energy absorbing member 20 is connected to the tube 12. The movable member 18 is connected to the energy absorbing member 20 and moves the tube 12 by being moved by the driving force of the motor 15. The energy absorbing member 20 has a stiffness that moves the tube 12 by transmitting the driving force of the motor 15 from the movable member 18 to the tube 12. The energy absorbing member 20 is deformable to absorb energy of an impact force that is applied to the energy absorbing member 20 through the steering shaft 11 and the tube 12 during a secondary collision.

According to the above aspect, the energy absorbing member 20 is part of a structure that couples the movable member 18 and the tube 12 together to transmit the driving force of the motor 15 to the tube 12. Further, during the secondary collision, the energy absorbing member 20 is deformed, thereby absorbing the impact energy received through the tube 12, i.e., thereby absorbing an impact applied by a driver to the steering shaft 11 and the tube 12. That is, a structural element that serves to move the tube 12 to telescopically extend and retract the steering shaft 11 during the telescopic position adjustment, which adjusts the distance between a driver and the steering wheel 2 using the driving force of the motor 15, also serves to damp the impact applied to the tube 12. This reduces the number of parts of a structure that moves the tube 12 and that damps the impact applied to the tube 12, thus simplifying the structure. Thus, the steering system 100 has a simple structure that absorbs the impact during the secondary collision.

In the steering system 100 according to the first embodiment, the energy absorbing member 20 is deformed synchronously with the movement of the tube 12 during the secondary collision. According to this structure, the energy absorbing member 20 absorbs the impact energy during the secondary collision while moving the steering wheel 2 coupled to the top of the steering shaft 11 in a direction away from a driver. Thus, the steering system 100 effectively reduces damage to a driver impacting the steering wheel 2.

According to the first embodiment, the steering system 100 includes the limiter member 21 that limits deformation of the energy absorbing member 20. The limiter member 21 is breakable by the impact force applied thereto through the steering shaft 11 and the tube 12 during the secondary collision to allow the deformation of the energy absorbing member 20. According to this structure, after the limiter member 21 is broken, the energy absorbing member 20 is deformed. Thus, the limiter member 21 controls how much impact force is required to start allowing deformation of the energy absorbing member 20, i.e., the limiter member 21 controls how much impact force is required to start absorbing the impact energy and start moving the tube 12. Further, after the limiter member 21 is broken, the energy absorbing member 20 is easily deformed even by a force less than the impact force required to break the limiter member 21. Thus, the energy absorbing member 20 absorbs the impact energy while reducing a reaction force exerted on a driver impacting the steering wheel 2. The limiter member 21 also absorbs the impact energy during the secondary collision by being broken.

According to the first embodiment, the steering system 100 includes the housing 13 and the biasing member 33. The housing 13 supports the tube 12 such that the tube 12 is slidably movable. The biasing member 33 presses the tube 12 toward the sliding surface of the housing 13. The energy absorbing member 20 has a stiffness that moves the tube 12 against the sliding resistance acting between the housing 13 and the tube 12. This structure allows the energy absorbing member 20 to move the tube 12 synchronously with the movement of the movable member 18. Thus, the steering system 100 enables smooth telescopic movement of the steering shaft 11.

According to the first embodiment, the energy absorbing member 20 of the steering system 100 includes the first fixation portion 20a, the second fixation portion 20b, and the joint portion 20c. The first fixation portion 20a is fixed to the movable member 18. The second fixation portion 20b is fixed to the tube 12. The joint portion 20c joins the first fixation portion 20a and the second fixation portion 20b together, and is deformable during the secondary collision. Each of the first fixation portion 20a and the second fixation portion 20b is fixed at at least two positions. This structure helps to suppress the relative rotation between the first fixation portion 20a and the movable member 18 about a portion where the first fixation portion 20a and the movable member 18 are fixed together. This structure also helps to suppress the relative rotation between the second fixation portion 20b and the tube 12 about a portion where the second fixation portion 20b and the tube 12 are fixed together. Thus, the energy absorbing member 20 efficiently transmits, to the tube 12, the movement and driving force of the movable member 18 driven by the motor 15. Accordingly, the steering system 100 achieves efficient telescopic movement of the steering shaft 11 using the motor 15. Further, this structure helps to suppress the relative rotation between the first fixation portion 20a and the second fixation portion 20b and the relative rotation between the movable member 18 and the tube 12. Thus, variation in the amount of impact energy that the energy absorbing member 20 absorbs during the secondary collision is reduced. In other words, the energy absorbing member 20 has less variation in capacity to absorb the impact energy. According to the first embodiment, each of the first fixation portion 20a and the second fixation portion 20b is fixed at at least two positions. Alternatively, at least one of the first fixation portion 20a and the second fixation portion 20b may be fixed at at least two positions. This alternative structure also allows the energy absorbing member 20 to have less variation in capacity to absorb the impact energy during the secondary collision.

According to the first embodiment, the energy absorbing member 20 of the steering system 100 is a plate-like member. The energy absorbing member 20 includes the first fixation portion 20a, the second fixation portion 20b, and the joint portion 20c. The first fixation portion 20a is fixed to the movable member 18. The second fixation portion 20b is located facing the first fixation portion 20a and is fixed to the tube 12. The joint portion 20c joins the first fixation portion 20a and the second fixation portion 20b together, and is deformable during the secondary collision. This structure allows a reduction in the space occupied by the energy absorbing member 20, because the first fixation portion 20a and the second fixation portion 20b of the energy absorbing member 20 are located facing each other. This leads to a reduction in the size of a structure that couples the movable member 18, the energy absorbing member 20, and the tube 12 together.

Figure 9:
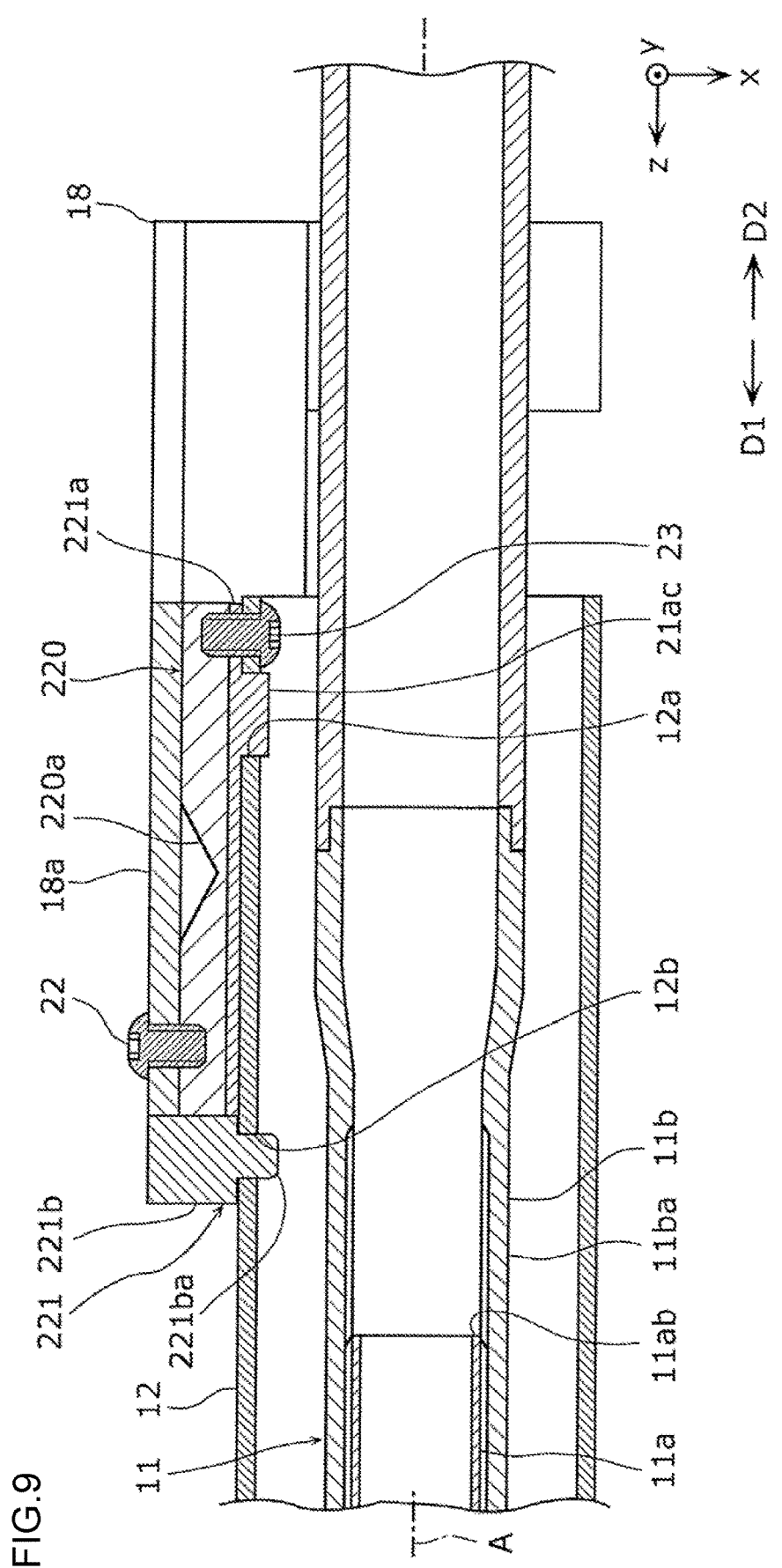
FIG. 9 is a schematic side cross-sectional view illustrating a steering system according to a second embodiment in the same manner as FIG. 7.

A steering system according to a second embodiment is described below. A difference of the second embodiment from the first embodiment is in the structure of an energy absorbing member. In the description below, the difference is described in detail, and the same features as those in the first embodiment are not described again. FIG. 9 is a diagram illustrating the steering system according to the second embodiment in the same manner as FIG. 7.

As illustrated in FIG. 9, the steering system according to the second embodiment includes an energy absorbing member 220 that is provided between the flat plate portion 18a of the movable member 18 and an interposition portion 221a of a limiter member 221. The energy absorbing member 220 is located adjacent to an engagement portion 221b of the limiter member 221. The energy absorbing member 220 has a rectangular plate shape and is made of a plastically deformable material, such as metal. The energy absorbing member 220 has a neck portion 220a. The neck portion 220a is located somewhere between both ends of the energy absorbing member 220 in the z-axis directions that are along the length of the energy absorbing member 220. The energy absorbing member 220 has a minimum cross-sectional area at the neck portion 220a. According to the second embodiment, the neck portion 220a is defined by a recess formed in a surface of the energy absorbing member 220 opposite to a surface of the energy absorbing member 220 that faces the interposition portion 221a. The recess is tapered toward the interposition portion 221a. The recess is not limited to such a tapered shape and may have any other shape. The neck portion 220a may be defined by any other element, other than a recess, that minimizes the cross-sectional area of the energy absorbing member 220 at the neck portion 220a.

The neck portion 220a is structured such that when a tensile force in the z-axis directions being applied to the neck portion 220a exceeds a predetermined force, the neck portion 220a is stretched or broken by being plastically deformed, and such that when the tensile force does not exceed the predetermined force, the neck portion 220a remains undeformed in the z-axis directions. The predetermined force may be the sliding resistance acting between the tube 12 and the housing 13.

The first fastener 22 connects the flat plate portion 18a and the energy absorbing member 220 together at a position downstream of the neck portion 220a in the positive z-axis direction, i.e., at a position between the neck portion 220a and the engagement portion 221b of the limiter member 221. The second fastener 23 connects the energy absorbing member 220 and the cylindrical wall of the tube 12 together at a position downstream of the neck portion 220a in the negative z-axis direction, i.e., at a position across the neck portion 220a from the engagement portion 221b. In the example of FIG. 9, one first fastener 22 and one second fastener 23 are used. Alternatively, two or more first fasteners 22 and two or more second fasteners 23 may be used.

An engagement projection 221ba of the engagement portion 221b of the limiter member 221 is inserted in the second engagement hole 12b of the tube 12. That is, the engagement portion 221b is oriented oppositely to the engagement portion 21b of the first embodiment in the x-axis directions. Further, the interposition portion 221a and the engagement portion 221b are separate pieces. The engagement portion 221b is fixed to the flat plate portion 18a by engaging with the edge of the flat plate portion 18a, by fitting to the flat plate portion 18a, or by any other suitable method.

In the steering system according to the second embodiment, when the movable member 18 is moved by the motor 15 in the extension direction D1, the engagement portion 221b and the energy absorbing member 220 move the tube 12 in the extension direction D1 synchronously with the movement of the movable member 18 while respectively receiving a compressive force and a tensile force in the extension direction D1 associated with the sliding resistance between the tube 12 and the housing 13. On the other hand, when the movable member 18 is moved by the motor 15 in the retraction direction D2, the energy absorbing member 220 moves the tube 12 in the retraction direction D2 synchronously with the movement of the movable member 18 while receiving a compressive force in the retraction direction D2 associated with the sliding resistance between the tube 12 and the housing 13. When the engagement projection 221ba of the engagement portion 221b is broken by an impact force in the retraction direction D2 applied to the tube 12 during the secondary collision, a tensile force in the retraction direction D2 is applied to the energy absorbing member 220 through the second fastener 23. As a result, the energy absorbing member 220 is stretched or broken at the neck portion 220a. The energy absorbing member 220 is plastically deformed by being stretched or broken, thereby absorbing the impact force while moving the tube 12 in the retraction direction D2. Thus, the steering system according to the second embodiment has the same advantageous effects as the steering system 100 according to the first embodiment.

Figure 10:
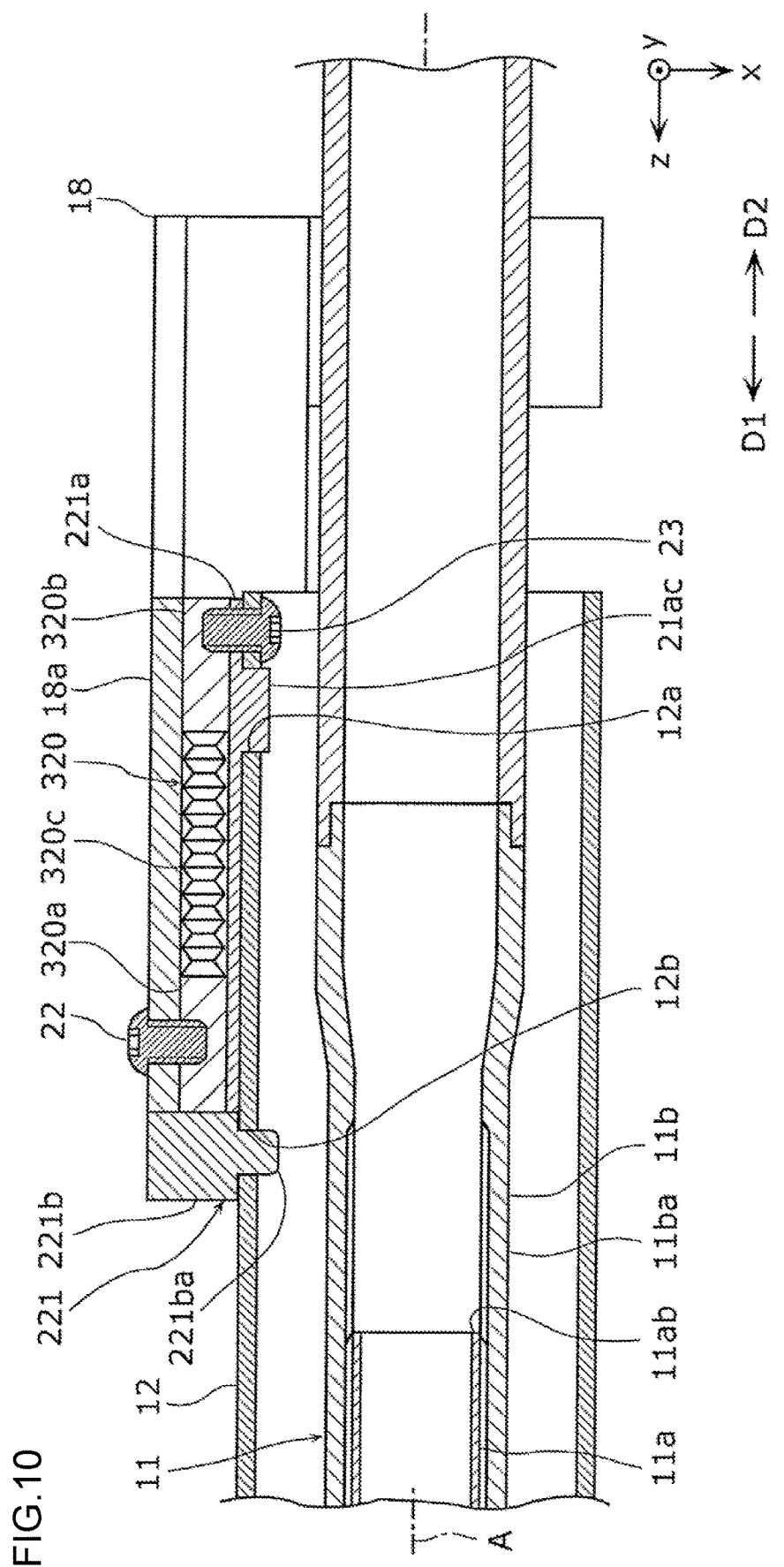
FIG. 10 is a schematic side cross-sectional view illustrating a steering system according to a third embodiment in the same manner as FIG. 9.

A steering system according to a third embodiment is described below. A difference of the third embodiment from the second embodiment is in the structure of an energy absorbing member. In the description below, the difference is described in detail, and the same features as those in the preceding embodiments are not described again. FIG. 10 is a diagram illustrating the steering system according to the third embodiment in the same manner as FIG. 9.

As illustrated in FIG. 10, the steering system according to the third embodiment includes an energy absorbing member 320. The energy absorbing member 320 includes a first fixation portion 320a, a second fixation portion 320b, and a joint portion 320c. The first fixation portion 320a is located adjacent to the engagement portion 221b of the limiter member 221. The first fixation portion 320a is fixed to the flat plate portion 18a of the movable member 18 by the first fastener 22. The second fixation portion 320b is located away from the engagement portion 221b in the negative z-axis direction. The second fixation portion 320b is fixed to the cylindrical wall of the tube 12 by the second fastener 23. The joint portion 320c is located between the first fixation portion 320a and the second fixation portion 320b in the z-axis directions, and joins the first fixation portion 320a and the second fixation portion 320b together. The first fixation portion 320a, the joint portion 320c, and the second fixation portion 320b are aligned in the z-axis directions. According to the third embodiment, the joint portion 320c is a telescopic bellows that is telescopically extendable and retractable in the z-axis directions. Specifically, the joint portion 320c is a metallic bellows. The joint portion 320c is structured such that when a compressive or tensile force in the z-axis directions being applied to the joint portion 320c exceeds a predetermined force, the joint portion 320c is compressed or stretched, and such that when the compressive or tensile force does not exceed the predetermined force, the joint portion 320c remains undeformed in the z-axis directions. The predetermined force may be the sliding resistance acting between the tube 12 and the housing 13. In the example of FIG. 10, one first fastener 22 and one second fastener 23 are used. Alternatively, two or more first fasteners 22 and two or more second fasteners 23 may be used.

In the steering system according to the third embodiment, when the movable member 18 is moved in the extension direction D1, the engagement portion 221b and the energy absorbing member 320 move the tube 12 in the extension direction D1 synchronously with the movement of the movable member 18 while respectively receiving a compressive force and a tensile force in the extension direction D1 associated with the sliding resistance between the tube 12 and the housing 13. On the other hand, when the movable member 18 is moved in the retraction direction D2, the energy absorbing member 320 moves the tube 12 in the retraction direction D2 synchronously with the movement of the movable member 18 while receiving a compressive force in the retraction direction D2 associated with the sliding resistance between the tube 12 and the housing 13. In the event of the secondary collision, the engagement projection 221ba of the engagement portion 221b is broken by an impact force in the retraction direction D2 applied to the tube 12. This applies a tensile force in the retraction direction D2 to the energy absorbing member 320, thus stretching the joint portion 320c. The joint portion 320c is plastically deformed by being stretched, thereby absorbing the impact energy while moving the tube 12 in the retraction direction D2.

The first fixation portion 320a may be fixed only to the cylindrical wall of the tube 12, and the second fixation portion 320b may be fixed only to the flat plate portion 18a of the movable member 18. In this case, the limiter member 221 may have the same structure as the limiter member 21 of the first embodiment. In the steering system according to the third embodiment, when the movable member 18 is moved in the extension direction D1, the engagement portion 221b and the energy absorbing member 320 move the tube 12 in the extension direction D1 synchronously with the movement of the movable member 18 while receiving a compressive force in the extension direction D1 associated with the sliding resistance between the tube 12 and the housing 13. On the other hand, when the movable member 18 is moved in the retraction direction D2, the energy absorbing member 320 moves the tube 12 in the retraction direction D2 synchronously with the movement of the movable member 18 while receiving a tensile force in the retraction direction D2 associated with the sliding resistance between the tube 12 and the housing 13. In the event of the secondary collision, the engagement projection 221ba of the engagement portion 221b is broken by an impact force in the retraction direction D2 applied to the tube 12. This applies a compressive force in the retraction direction D2 to the energy absorbing member 320, thus compressing the joint portion 320c. The joint portion 320c is plastically deformed by being compressed, thereby absorbing the impact energy while moving the tube 12 in the retraction direction D2. Thus, the steering system according to the third embodiment has the same advantageous effects as the steering system 100 according to the first embodiment.

Figure 11:
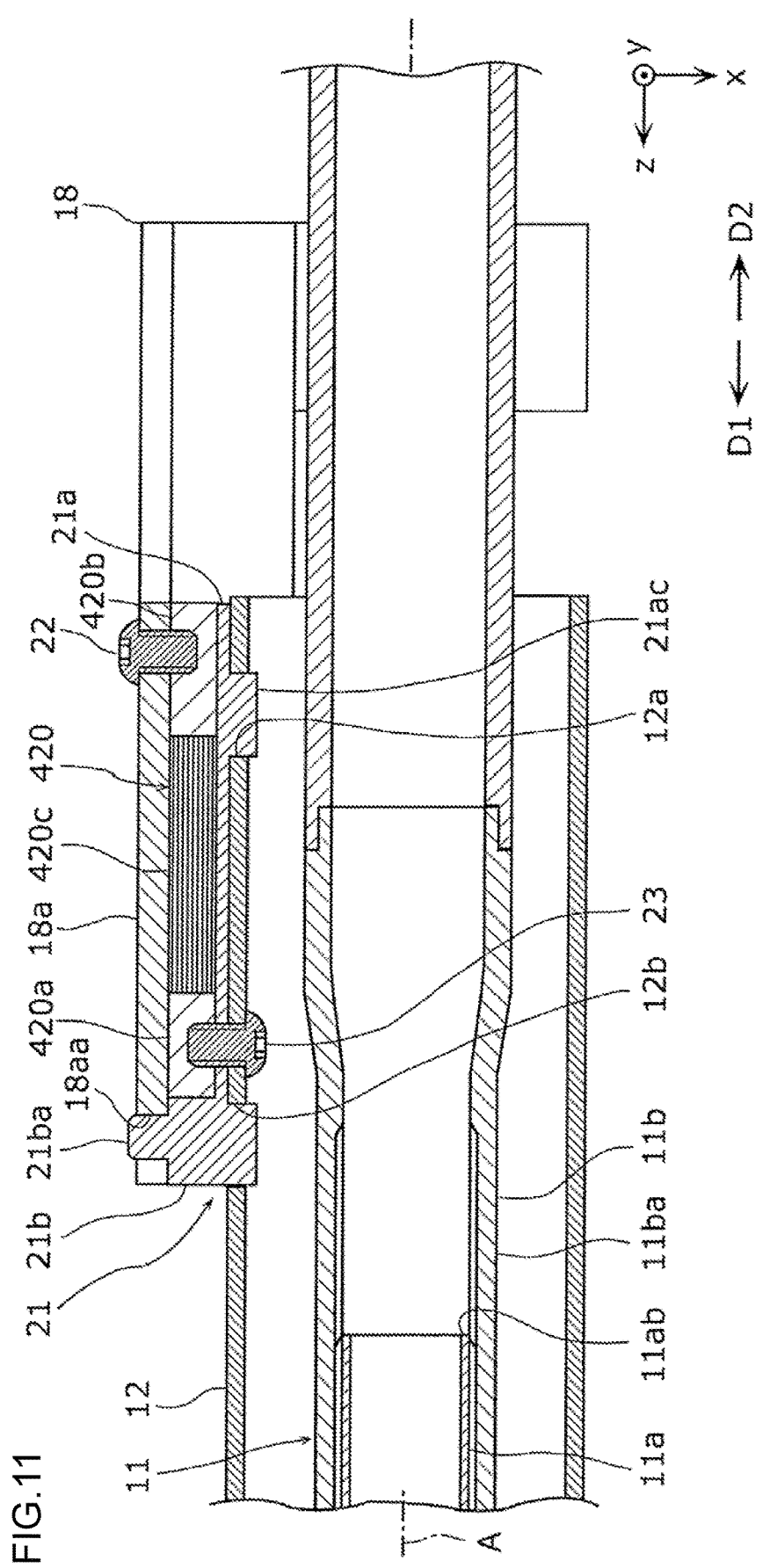
FIG. 11 is a schematic side cross-sectional view illustrating a steering system according to a fourth embodiment in the same manner as FIG. 10.

A steering system according to a fourth embodiment is described below. A difference of the fourth embodiment from the third embodiment is in the structure of an energy absorbing member. In the description below, the difference is described in detail, and the same features as those in the preceding embodiments are not described again. FIG. 11 is a diagram illustrating the steering system according to the fourth embodiment in the same manner as FIG. 10.

As illustrated in FIG. 11, the steering system according to the fourth embodiment includes an energy absorbing member 420. The energy absorbing member 420 includes a first fixation portion 420a, a second fixation portion 420b, and a joint portion 420c. The first fixation portion 420a is located adjacent to the engagement portion 21b of the limiter member 21. The limiter member 21 of the fourth embodiment has the same structure as that of the first embodiment. The first fixation portion 420a is fixed to the cylindrical wall of the tube 12 by the second fastener 23. The second fixation portion 420b is located away from the engagement portion 21b in the negative z-axis direction and is fixed to the flat plate portion 18a of the movable member 18 by the first fastener 22. The joint portion 420c is located between the first fixation portion 420a and the second fixation portion 420b in the z-axis directions, and joins the first fixation portion 420a and the second fixation portion 420b together. According to the fourth embodiment, the joint portion 420c is structured to have multiple cavities. For example, the joint portion 420c may have a honeycomb structure. Specifically, the joint portion 420c includes multiple partition walls that extend in the z-axis directions to define hexagonal prismatic cavities extending in the z-axis directions therebetween. The partition walls separate adjacent hexagonal prismatic cavities from each other. The cavities are not limited to hexagonal prismatic shapes. For example, the joint portion 420c may include multiple partition walls arranged in a grid to define adjacent rectangular prismatic cavities therebetween. The joint portion 420c may be made of metal or resin. The joint portion 420c is structured such that when a compressive force in the z-axis directions being applied to the joint portion 420c exceeds a predetermined force, the joint portion 420c is crushed in the z-axis directions, and such that when the compressive force does not exceed the predetermined force, the joint portion 420c remains undeformed in the z-axis directions. The predetermined force may be the sliding resistance acting between the tube 12 and the housing 13. In the example of FIG. 11, one first fastener 22 and one second fastener 23 are used. Alternatively, two or more first fasteners 22 and two or more second fasteners 23 may be used.

In the steering system according to the fourth embodiment, when the movable member 18 is moved in the extension direction D1, the engagement portion 21b and the energy absorbing member 420 move the tube 12 in the extension direction D1 synchronously with the movement of the movable member 18 while receiving a compressive force in the extension direction D1 associated with the sliding resistance between the tube 12 and the housing 13. On the other hand, when the movable member 18 is moved in the retraction direction D2, the energy absorbing member 420 moves the tube 12 in the retraction direction D2 synchronously with the movement of the movable member 18 while receiving a tensile force in the retraction direction D2 associated with the sliding resistance between the tube 12 and the housing 13. In the event of the secondary collision, the engagement projection 21ba of the engagement portion 21b is broken by an impact force in the retraction direction D2 applied to the tube 12. This applies a compressive force in the retraction direction D2 to the energy absorbing member 420, thus crushing the joint portion 420c. The joint portion 420c is plastically deformed by being crushed, thereby absorbing the impact energy while moving the tube 12 in the retraction direction D2. Thus, the steering system according to the fourth embodiment has the same advantageous effects as the steering system 100 according to the first embodiment.

While a steering system according to some aspects of the invention has been described with reference to illustrative embodiments, the invention is not limited to the embodiments. It will be understood by those skilled in the art that various modifications and combinations of the embodiments are possible without departing from the scope of the invention.

Although the steering systems of the embodiments illustrate that the threaded shaft 16a of the converter 16 is connected to the speed reducer 17 and that the screw-hole member 16b of the converter 16 is connected to the movable member 18, the converter 16 is not limited to this structure. For example, the threaded shaft 16a may be connected to the movable member 18 and move unitarily with the movable member 18, and the screw-hole member 16b may be connected to the speed reducer 17 and rotated by the motor 15. In this case, when the motor 15 rotates the screw-hole member 16b, the threaded shaft 16a reciprocates, together with the movable member 18, relative to the screw-hole member 16b in the axial directions. Accordingly, the tube 12 moves in the extension direction D1 or in the retraction direction D2.

Although the steering systems of the embodiments illustrate that the converter 16 includes the threaded shaft 16a and the screw-hole member 16b, the converter 16 is not limited to this structure. The converter 16 may have any structure sufficient to convert rotary motion to linear motion. For example, the converter 16 may include a rack gear and a pinion gear that mesh each other to form a rack and pinion structure. A ball screw may be used to reduce roiling resistance of a mesh between the threaded shaft 16a and the screw-hole member 16b.

Although the steering systems of the embodiments illustrate that the engagement portion of the limiter member has one engagement projection, the engagement portion may have two or more engagement projections. In this case, the engagement projections may be alighted in the directions D1 and D2 or alighted in directions perpendicular to the directions D1 and D2. When the engagement projections are alighted in the directions D1 and D2, the energy absorbing member damps impact energy in a stepwise manner during the secondary collision. On the other hand, when the engagement projections are alighted in directions perpendicular to the directions D1 and D2, the break strength of the engagement projections are increased. This allows adjustment of how much impact energy is required to break the engagement projections.

The steering system of the first embodiment illustrates that the energy absorbing member has a curved section that is deformed to absorb impact force. The steering system of the second embodiment illustrates that the energy absorbing member is stretched or broken to absorb impact force. The steering system of the third embodiment illustrates that the energy absorbing member is stretched or compressed to absorb impact force. The steering system of the fourth embodiment illustrates that the energy absorbing member is crushed to absorb impact force. The energy absorbing member is not limited to the structures described in the embodiments, and may have any other structure sufficient to absorb impact force.

Although the steering system 100 of the first embodiment illustrates that the joint portion 20c of the energy absorbing member 20 has a curved section, the joint portion 20c is not limited to this structure. For example, the joint portion 20c may extend linearly like a flat plate or may be bent. Although the steering system 100 of the first embodiment illustrates that the joint portion 20c joins one end of the first fixation portion 20a to one end of the second fixation portion 20b that is located facing the one end of the first fixation portion 20a in the x-axis directions, the joint portion 20c may join together other ends of the first fixation portion 20a and the second fixation portion 20b. Although the steering system 100 of the first embodiment illustrates that the energy absorbing member 20 has a U-shape, the energy absorbing member 20 may have any other shape, such as a Z-shape. Although the steering system 100 of the first embodiment illustrates that the energy absorbing member 20 has one joint portion 20c, the energy absorbing member 20 may have two or more joint portions. For example, the energy absorbing member 20 may have two joint portions: a first joint portion that joints one end of the first fixation portion 20a to one end of the second fixation portion 20b; and a second joint portion that joints the other end of the first fixation portion 20*a* to the other end of the second fixation portion 20*b*. In this case, the energy absorbing member 20 has an elongated circular shape. Such modifications to the energy absorbing member allow the energy absorbing member 20 to absorb impact energy by deformation of the joint portion.

Although the steering systems of the embodiments illustrate that the tube 12 of the steering system is cylindrical in shape, the tube 12 is not limited to a cylindrical shape. The tube 12 may have any shape in cross section. Examples of the cross-sectional shape of the tube 12 may include a polygonal shape, an elliptical shape, an elongated circular shape, and a circular or elliptical shape with a width across flats. Although the steering systems of the embodiments illustrate that the tube 12 has a cylindrical shape that covers the entire outer circumference of the steering shaft 11, the tube 12 may have any shape that covers part of the outer circumference of the steering shaft 11.

A steering system according to the invention is useful as a motor-driven telescopic steering system.

The steering system according to the invention has a simple structure for absorbing impact energy during a vehicle collision.

What is claimed is:

1. A steering system that is telescopically extendable and retractable using a motor driving force, the steering system comprising:
   a motor;
   a telescopic steering shaft;
   a supporting member that supports the steering shaft such that the steering shaft is rotatable, the supporting member being movable with telescopic movement of the steering shaft;
   an energy absorbing member connected to the supporting member;
   a movable member connected to the energy absorbing member and configured to move the supporting member by being moved by a driving force of the motor, wherein:
   the energy absorbing member has a stiffness that moves the supporting member by transmitting the driving force of the motor from the movable member to the supporting member, and
   the energy absorbing member is deformable to absorb impact energy when an impact force is applied to the energy absorbing member through the steering shaft and the supporting member during a secondary collision; and
   a limiter member that limits deformation of the energy absorbing member, wherein:
   the limiter is breakable by the impact force during the secondary collision to allow the deformation of the energy absorbing member.

2. The steering system according to claim 1, wherein the energy absorbing member is deformable synchronously with movement of the supporting member during the secondary collision.

3. The steering system according to claim 1, further comprising:
   a housing that has a sliding surface and that supports the supporting member such that the supporting member is slidably movable on the sliding surface; and
   a biasing member that presses the supporting member toward the sliding surface, wherein
   the energy absorbing member has the stiffness that moves the supporting member against a sliding resistance between the supporting member and the housing.

4. The steering system according to claim 1, wherein the energy absorbing member includes a first fixation portion fixed to the movable member, a second fixation portion fixed to the supporting member, and a joint portion that joints the first fixation portion and the second fixation portion together and that is deformable during the secondary collision, and
at least one of the first fixation portion and the second fixation portion is fixed at at least two positions.

5. The steering system according to claim 1, wherein the energy absorbing member is a plate-like member, and the energy absorbing member includes a first fixation portion fixed to the movable member, a second fixation portion located facing the first fixation portion and fixed to the supporting member, and a joint portion that joins the first fixation portion and the second fixation portion together and that is deformable during the secondary collision.

* * * * *